US006696825B2

(12) United States Patent
Harris et al.

(10) Patent No.: US 6,696,825 B2
(45) Date of Patent: Feb. 24, 2004

(54) DC-TO-DC CONVERTER WITH FAST OVERRIDE FEEDBACK CONTROL AND ASSOCIATED METHODS

(75) Inventors: Matthew Burdet Harris, Durham, NC (US); Robert Haynes Isham, Flemington, NJ (US)

(73) Assignee: Intersil Americas Inc., Milpitas, CA (US)

(*) Notice: Subject to any disclaimer, the term of this patent is extended or adjusted under 35 U.S.C. 154(b) by 17 days.

(21) Appl. No.: 10/100,439

(22) Filed: Mar. 18, 2002

(65) Prior Publication Data

US 2003/0173941 A1 Sep. 18, 2003

(51) Int. Cl.[7] .................................................. G05F 1/40
(52) U.S. Cl. ....................................... 323/282; 323/285
(58) Field of Search ................................. 323/282, 283, 323/284, 286, 287, 288; 363/37, 40, 41, 97, 131

(56) References Cited

U.S. PATENT DOCUMENTS

| | | | |
|---|---|---|---|
| 4,652,769 A | 3/1987 | Smith et al. ................... 307/31 |
| 4,929,882 A | 5/1990 | Szepesi ........................ 323/222 |
| 4,975,823 A | * 12/1990 | Rilly et al. .................... 363/56 |
| 5,490,055 A | 2/1996 | Boylan et al. .................. 363/41 |
| 5,617,016 A | 4/1997 | Borghi et al. ................. 323/284 |
| 5,821,740 A | 10/1998 | Hodgins et al. ............... 323/277 |
| 5,912,552 A | * 6/1999 | Tateishi ...................... 323/285 |
| 5,926,384 A | 7/1999 | Jochum et al. ................. 363/56 |
| 5,982,160 A | * 11/1999 | Walters et al. ............... 323/282 |
| 6,005,377 A | 12/1999 | Chen et al. ................... 323/283 |
| 6,025,704 A | 2/2000 | Elliott ........................ 323/280 |
| 6,052,298 A | * 4/2000 | Wallace et al. ................. 363/95 |
| 6,101,108 A | 8/2000 | Wittenbreder, Jr. ............. 363/65 |
| 6,278,263 B1 | 8/2001 | Walters et al. ............... 323/272 |

OTHER PUBLICATIONS

Article/Data sheet by Intersil entitled Microprocessor CORE Voltage Regulator Using Multi–Phase Buck PWM Control Without Programmable Droop dated Nov. 2001; File No. 9003.1 (ISL6554); pp. 1–16.
Article/Data sheet by Intersil entitled Multi–Purpose Precision Multi–Phase PWM Controller with Optional Active Voltage Positioning dated Nov. 2001; File No. 9027.2 (ISL6558); pp. 1–14.
Article by Maxim Integrated Products entitled High–Speed Step–Down Controller with Synchronous Rectification for CPU Power; No. MAX1639; pp. 1–13, no date available.
Article by Maxim Integrated Products entitled Dynamically–Adjustable, Synchronous Step–Down Controller with Integrated Voltage Positioning; No. MAX1813; pp. 1–38, no date.

* cited by examiner

Primary Examiner—Rajnikant B. Patel
(74) Attorney, Agent, or Firm—Allen, Dyer, Doppelt Milbrath & Gilchrist, P.A.

(57) ABSTRACT

A DC-to-DC converter includes a pulse width modulation (PWM) circuit cooperating with at least one power switch for supplying power from a source to a load over a range between a lower limit and an upper limit to thereby control an output voltage for the load. The converter may also include a primary feedback control loop cooperating with the PWM circuit for supplying power to the load between the lower and upper limits based upon the output voltage during normal load transient conditions. The converter may also include at least one override feedback control loop cooperating with the PWM circuit for overriding the primary feedback control loop and supplying power to the load at one of the lower and upper limits based upon the output voltage during a corresponding relatively fast load transient condition. Accordingly, relatively fast load transients can be followed by the converter.

37 Claims, 5 Drawing Sheets

DC-TO-DC CONVERTER WITH FAST OVERRIDE FEEDBACK CONTROL AND ASSOCIATED METHODS

FIELD OF THE INVENTION

The present invention relates to the field of electronic circuits and, more particularly, to a DC-to-DC converter having control loops for following load transients and associated methods.

BACKGROUND OF THE INVENTION

DC-to-DC power converters are widely used to supply power to electronic devices, such as in computers, printers, etc. Such DC-to-DC converters are available in a variety of configurations for producing a desired output voltage from a source voltage. For example, a buck or step down converter produces an output voltage that is less than the source voltage. A typical step down converter includes at least one power switch and a pulse width modulation circuit connected thereto to selectively connect the source voltage to an inductor to thereby power the load.

Unfortunately, rapidly changing load conditions may create output voltage transients. In other words, it may be difficult for the control circuitry of the DC-to-DC converter to provide a desired voltage to the load when the impedance of the load may be rapidly changing. In the past large filtering capacitors or capacitor banks, or more costly higher quality capacitors have been provided to filter the output voltage. U.S. Pat. No. 5,926,384 to Jochum et al., and assigned to the assignee of the invention, discloses an approach wherein current is selectively sourced to the load or sinked therefrom to reduce the need for filtering capacitors.

U.S. Pat. No. 5,617,016 to Borghi et al. discloses a DC-to-DC converter including a PWM regulation loop and a hysteretic control loop which are alternately enabled as a function of the load level. When the load drops below a preset limit, the converter switches from the PWM control mode to the hysteretic control mode. Accordingly, switching losses are reduced during periods of operation at the relatively low load level.

U.S. Pat. No. 6,052,298 to Wallace et al. discloses a noise suppression circuit for a DC-to-DC converter which includes multiple parallel feedback loops. A first loop sets the steady state output voltage. A second feedback loop cooperates with the first loop in an attempt to prevent the output voltage from exceeding a high voltage level. The third feedback loop cooperates with the first loop in an attempt to prevent the output voltage from dropping below a low voltage level. The second and third loops each operate in a linear mode in combination with the first control loop. Accordingly, although the converter may handle faster load transients, it may still not be sufficiently fast to follow fast load transients as may occur in powering certain rapidly changing loads, such as those associated with microprocessors and computers, for example.

SUMMARY OF THE INVENTION

In view of the foregoing background, it is therefore an object of the present invention to provide a DC-to-DC converter and associated methods to maintain a relatively constant output voltage even when experiencing relatively rapid load transients.

This and other objects, features and advantages in accordance with the present invention are provided by a DC-to-DC converter comprising a pulse width modulation (PWM) circuit cooperating with at least one power switch for supplying power from a source to a load over a range between a lower limit and an upper limit to thereby control an output voltage for the load. More particularly, the converter may include a primary feedback control loop cooperating with the PWM circuit for supplying power to the load between the lower and upper limits based upon the output voltage during normal conditions. The converter may also include at least one override feedback control loop cooperating with the PWM circuit for overriding the primary feedback control loop and supplying power to the load at one of the lower and upper limits based upon the output voltage during a corresponding relatively fast load transient condition. Accordingly, relatively fast load transients can be followed by the converter.

The at least one override feedback control loop may define at least one trip point based upon the output voltage for overriding the primary feedback control loop and supplying power to the load at one of the lower and upper limits. In some advantageous embodiments, the at least one trip point is selectable. For example, the converter may be in integrated circuit form and include an integrated circuit substrate. At least portions of the PWM circuit, the primary feedback control loop, and the at least one override feedback control loop may thus be formed in the integrated circuit substrate. In such embodiments, the at least one trip point may be selectable by external components from the integrated circuit substrate. A relatively small number of pins may also advantageously be used for this selectability option.

The at least one trip point may be based upon a magnitude of a change in the output voltage. Alternately, the at least one trip point may be based upon a rate of change of the output voltage. In still other variations, the at least one trip point is advantageously based upon both a magnitude of a change in the output voltage and a rate of change of the output voltage.

The at least one override feedback control loop may comprise a positive override feedback control loop for supplying power to the load at the lower limit based upon a transient increase of the output voltage. In other words, as the power demanded by the load drops and the output voltage rises, the positive override feedback control loop will supply power to the load at the low limit. For example, the low limit may be a complete shut off of the at least one power switch. Conversely, the at least one override feedback control loop may comprise a negative override feedback control loop for supplying power to the load at the upper limit based upon a transient decrease of the output voltage. Of course, both override feedback control loops may be provided in yet other embodiments of the invention.

The at least one override feedback control loop may include a filter, and a comparator connected thereto. The comparator may have first and second inputs connected to the filter, with the first input also receiving a signal based upon the output voltage. The comparator may also have an output providing an override feedback control loop signal to the PWM circuit. In addition, the filter may include a resistor connected across the first and second inputs, and a capacitor connected between the second input and a voltage reference. A constant current circuit may also be connected to the second input of the comparator. Accordingly, the circuitry for implementing the fast transient feedback control is relatively straightforward.

Another aspect of the invention relates to a method for operating a DC-to-DC converter. The converter may comprise at least one power switch, a PWM circuit cooperating with the at least one power switch for supplying power from a source to a load, and a primary feedback control loop cooperating with the PWM circuit for supplying power to the load between lower and upper limits based upon the output voltage during normal conditions. The method may also include overriding the primary feedback control loop with at least one override feedback control loop for supplying power to the load at one of the lower and upper limits based upon the output voltage during a corresponding relatively fast load transient condition.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used for alternate embodiments.

Figure 1:
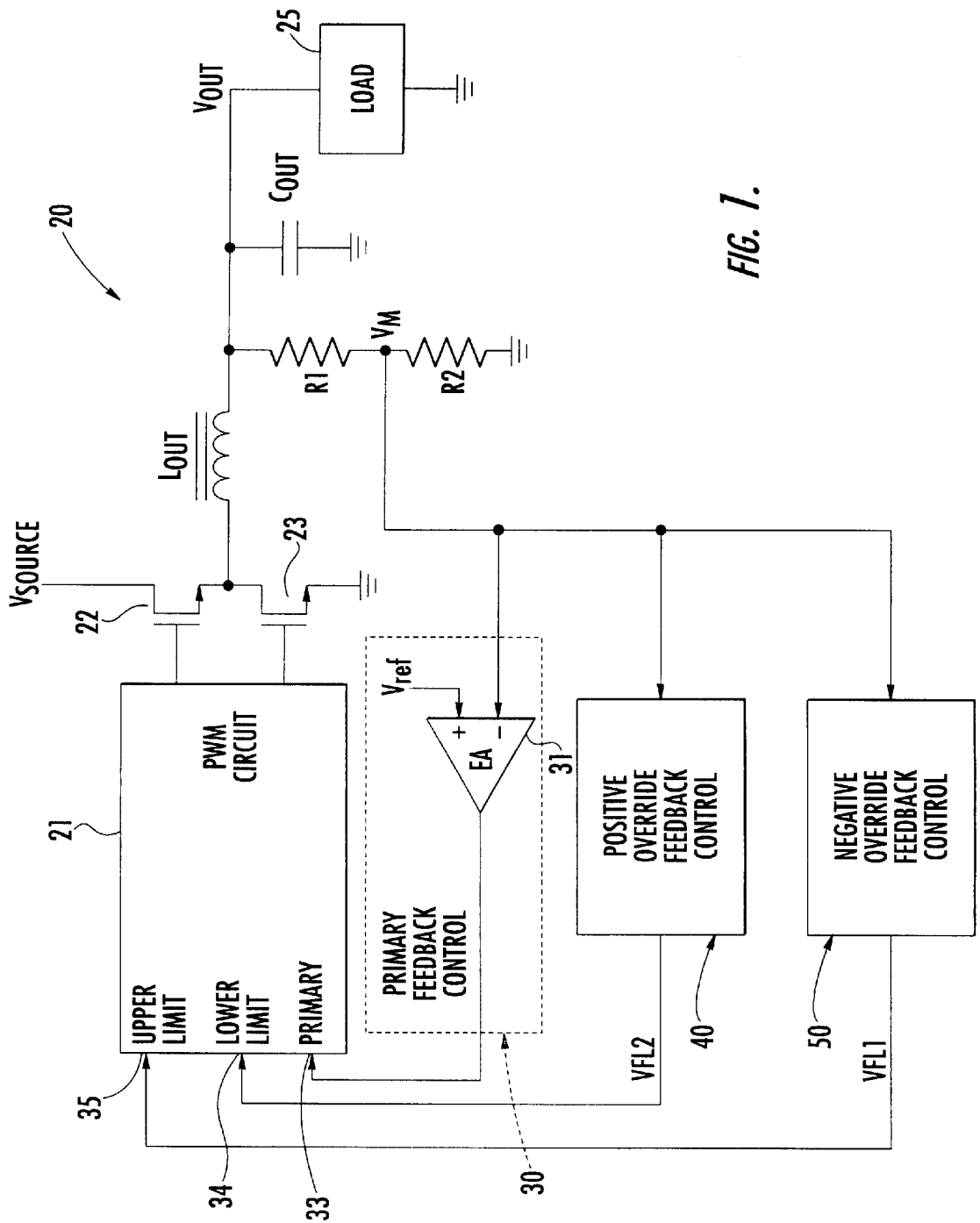
FIG. 1 is a schematic block diagram of a DC-to-DC converter in accordance with the present invention.

Referring initially to FIG. 1 the DC-to-DC converter 20 in accordance with the invention is now described. The DC-to-DC converter 20 illustratively includes a pulse width modulation (PWM) circuit 21 cooperating with a high side power switch 22 and a low side power switch 23 for supplying power from a voltage source, supplying power from a voltage Vsource, to a load 25. The load 25 may be a computer or microprocessor load which may produce relatively fast transients, while at the same time needing a supply voltage maintained over a fairly narrow range as will be appreciated by those skilled in the art.

The DC-to-DC converter 20 also includes an output capacitor Cout connected across the load 25 and an output inductor Lout connected in series with the load as will also be appreciated by those skilled in the art. A voltage divider, provided by resistors R1 and R2, generates a monitored voltage Vm which is a scaled replica of the output voltage Vout delivered to the load 25.

The converter 20 includes a primary feedback control loop 30 which cooperates with the PWM circuit 21 and the power switches 22, 23 for supplying power to the load 25 between lower and upper limits and based upon the output voltage Vout during normal load transient conditions. As shown in the illustrated embodiment, the monitored voltage Vm is supplied to the inverting input of an error amplifier 31. The output of the error amplifier 31 is, in turn, provided to a schematically illustrated primary input 33 of the PWM circuit 21. A non-inverting input of the error amplifier 31 receives a reference voltage Vref which sets the desired operating voltage as will be readily appreciated by those skilled in the art.

The DC-to-DC converter 20 also illustratively includes a pair of override feedback control loops 40, 50 which cooperate with the PWM circuit 21 and the power switches 22, 23 for overriding the primary feedback control loop 30 to thereby supply power to the load 25 at a corresponding lower or upper limit. Accordingly, relatively fast load transients can be followed by the converter 20.

A positive override feedback control loop 40 illustratively has an input connected to receive the monitored voltage Vm, which is a replica of the output voltage Vout, as will be appreciated by those skilled in the art. In addition, the positive override feedback control loop 40 has an output delivering a logic signal VFL2 to the schematically illustrated lower limit input 34 of the PWM circuit 21. Similarly, the negative override feedback control loop 50 has an input receiving the monitored voltage Vm, and an output delivering a logic signal VFL1 to the schematically illustrated upper limit input 35 of the PWM circuit 21. "Positive" describing the positive override feedback control loop is for a positive or increasing voltage transient, and "negative" is for a negative or decreasing transient.

Figure 2:
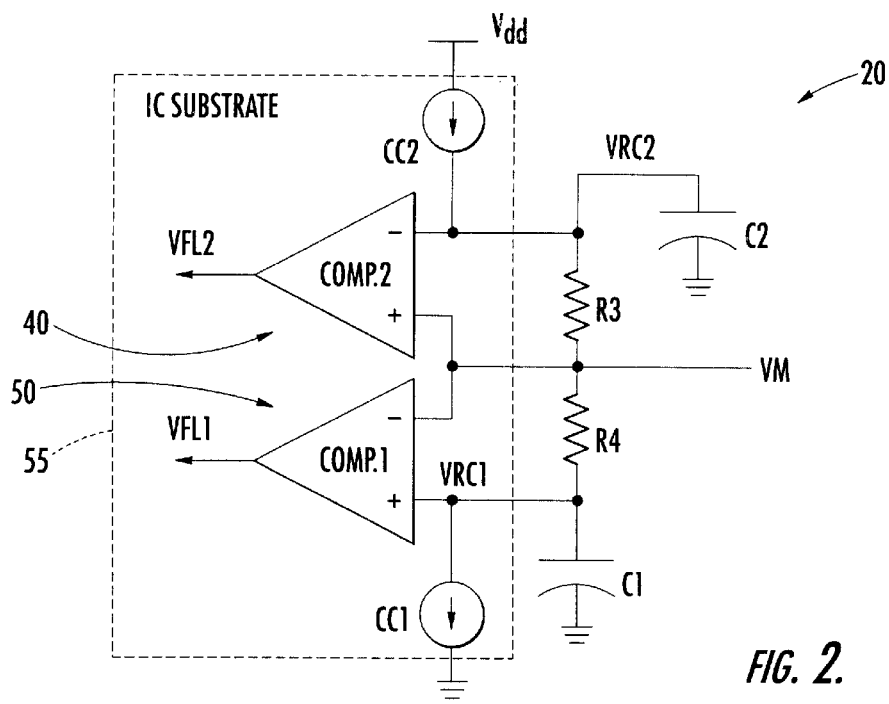
FIG. 2 is a more detailed circuit diagram of an embodiment of the positive and negative override feedback control loops as shown in FIG. 1.
Figure 3:
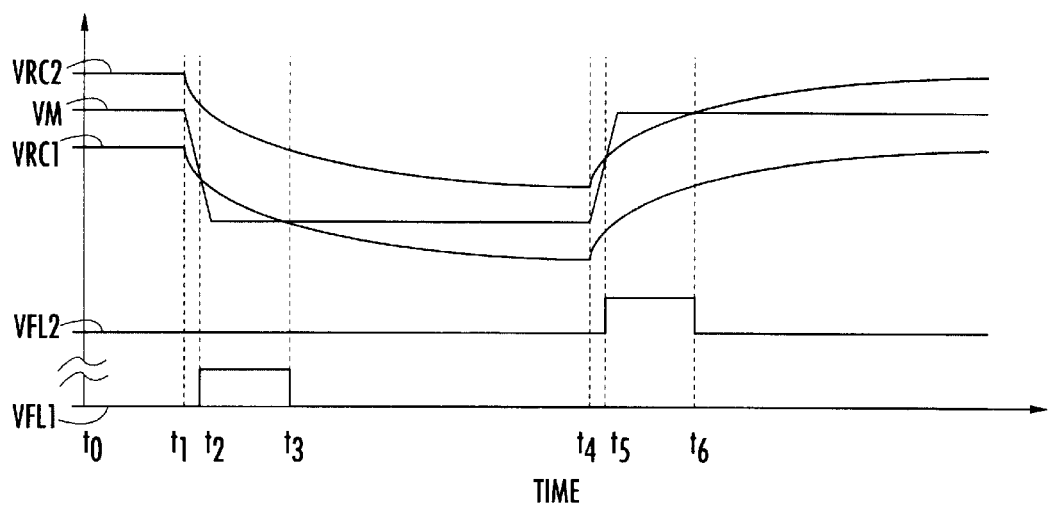
FIG. 3 is a schematic plot of various voltages in the circuit of FIGS. 1 and 2 upon experiencing first a negative transient and thereafter a positive transient.

Turning now additionally to FIGS. 2 and 3, further details and operation of the override feedback control loops 40, 50 are now described. The positive override feedback control loop 40 includes a low pass, RC-filter provided by resistor R3 and capacitor C2. A comparator COMP2 is connected to the filter. The comparator COMP2 illustratively includes first and second inputs (non-inverting and inverting) connected to the filter. The second or inverting input is connected to a node between the series connection of capacitor C2 and resistor R3. The other terminal of the resistor R3 is connected to the monitored voltage Vm and to the first or non-inverting input of the comparator COMP2. The other terminal of the capacitor C2 is connected to ground. A constant current circuit, in the form of a constant current source CC2 is connected between the voltage supply Vdd and the second or inverting input of the comparator COMP2.

Similarly, the negative override feedback control loop 50 includes an RC-filter provided by resistor R4 and capacitor C1, and a comparator COMP1 connected thereto. The comparator COMP1 includes first and second inputs (inverting and non-inverting in this instance) connected to the filter. The second or non-inverting input is connected to a node between the series connection of capacitor C1 and resistor R4. The other terminal of the resistor R4 is connected to the monitored voltage Vm and to the first or inverting input of the comparator COMP1. The other terminal of the capacitor C1 is connected to ground. A constant current circuit, in the form of a constant current sink CC1, is connected between the second or non-inverting input of the comparator COMP1 and ground. The first or non-inverting input of the comparator COMP2 is also illustratively connected to the first or inverting input of the comparator COMP1.

Considering now operation of the negative override feedback control loop 50, current through constant current sink CC1 produces a voltage drop across resistor R4. Therefore, under steady state conditions, the voltage VRC1 has a fixed negative offset from the monitored voltage Vm. This can be seen in the left hand portion of the plots of signals VRC1 and Vm of FIG. 3 from time t0 to time t1.

Thereafter, as the monitored voltage Vm starts to drop, the voltage VRC1 lags behind because of the delay associated with the low-pass RC filter. If the monitored voltage Vm changes so quickly that it moves to a value crossing the voltage VRC1, the output VFL1 of comparator COMP1 will change states. In the illustrated embodiment, the change is from a low to high logic value, although those of skill in the art will appreciate that an opposite configuration is also contemplated by the present invention. This trip point is shown in the left hand portion of the plots of FIG. 3 by the first crossing of voltages Vm and VRC1 at time t2. In response to the signal VFL1 changing states, the PWM circuit 21 is switched to its upper limit so that the high side switch 22 is fully on, and the low side switch 23 is fully off, for example, until the monitored voltage Vm increases and again crosses the voltage VRC1 at time t3. Note that between times t3 and t4 the voltage VRC1 returns to its normal offset below the monitored voltage Vm.

Operation of the positive override feedback control loop 40 is similar. As the monitored voltage Vm starts to increase, the voltage VRC2 lags behind because of the delay associated with the low-pass RC filter. If the monitored voltage Vm changes so quickly that it moves to a value crossing the voltage VRC2, the output VFL2 of comparator COMP2 will change states. This trip point is shown in the right hand portion of the plots of FIG. 3 by the first crossing of voltages Vm and VRC2 at time t5. In response to the signal VFL2 changing states, the PWM circuit 21 is switched to its lower limit so that the high side switch 22 is fully off, and the low side switch 23 is fully on, for example, until the monitored voltage Vm decreases and again crosses the voltage VRC2 at time t6.

In summary, each override feedback control loop 40, 50 defines a respective trip point based upon the output voltage Vout, as replicated by the monitored voltage Vm, for overriding the primary feedback control loop 30. The negative override feedback control loop 50 supplies power to the load 25 at the upper limit, and the positive feedback control loop 40 supplies power to the load at the lower limit.

In accordance with some advantageous embodiments of the converter 20, these trip points may be selectable. For example, the converter 20 may be in integrated circuit form and include an integrated circuit substrate, as schematically illustrated by the dashed line 55 in FIG. 2. At least portions of the PWM circuit 21, the primary feedback control loop 30, and override feedback control loops 40, 50 may thus be formed in the integrated circuit substrate 55. The trip points may be selectable by external components from the integrated circuit substrate 55. In the illustrated embodiment, capacitors C1, C2 and resistors R3, R4 may be externally provided. In other words, as few as two additional pins of the integrated circuit may be needed and only four external components may be needed in this illustrated embodiment.

Figure 4:
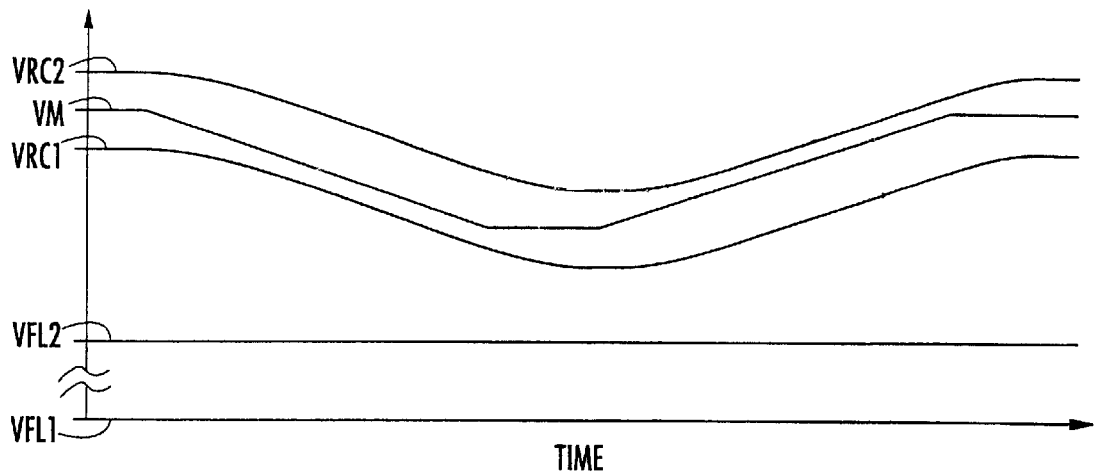
FIG. 4 is a schematic plot of various voltages in the circuit of FIGS. 1 and 2 during normal operation.

Referring now additionally to FIG. 4, steady state operation of the DC-to-DC converter 20 is illustrated. In this example, the monitored voltage Vm changes relatively slowly over time. The primary control loop 30 is able to follow the load transients. Accordingly, the respective filter voltages VRC1 and VRC2 lag behind without crossing the monitored voltage Vm. Accordingly, neither of the comparators COMP1 or COMP2 is triggered as can be appreciated by the unchanging outputs VPL1 and VFL2.

As will also be appreciated by those skilled in the art, the trip points are illustratively based upon both a magnitude of a change in the output voltage Vout, as well as a rate of change of the output voltage. Of course, in other embodiments, the trip points may be determined based solely upon magnitude, or rate of change.

Figure 5:
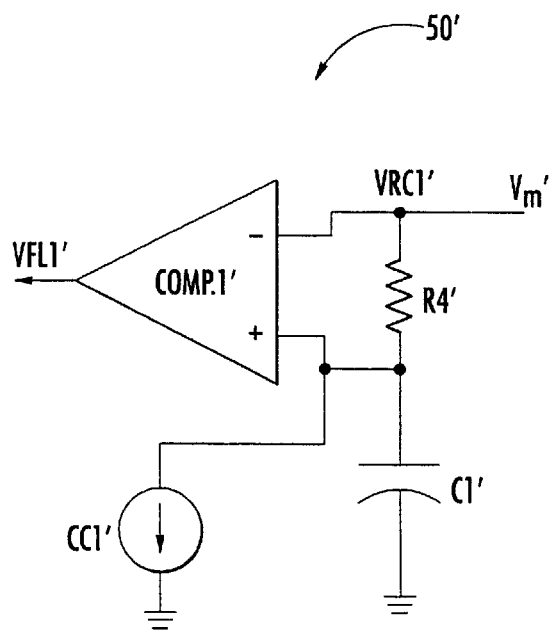
FIG. 5 is a schematic circuit diagram of a negative override feedback control loop as may be used in another embodiment of the DC-to-DC converter in accordance with the present invention.
Figure 6:
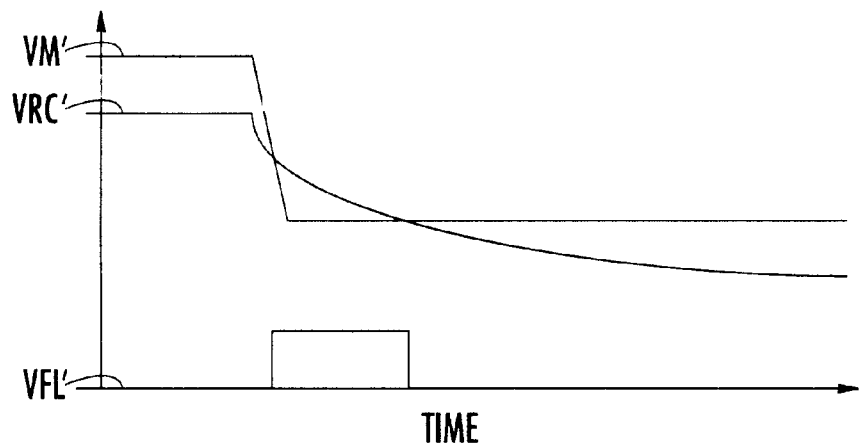
FIG. 6 is a schematic plot of various voltages in the circuit of FIG. 5 upon experiencing a negative transient.
Figure 7:
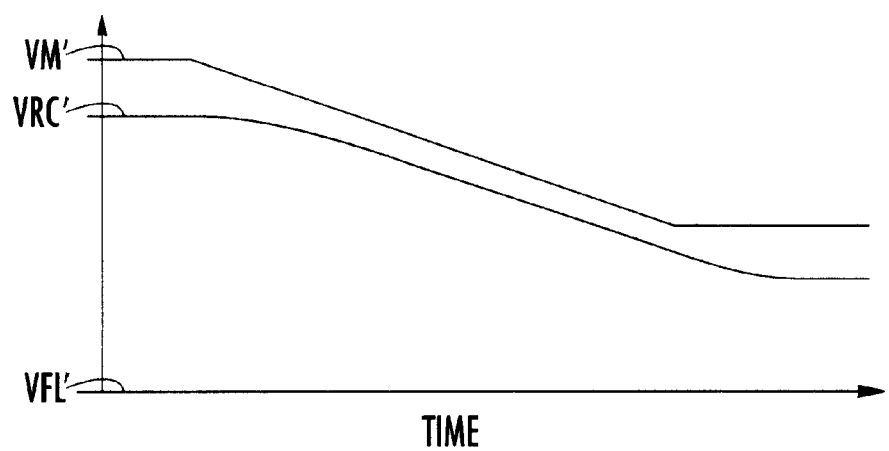
FIG. 7 is a schematic plot of various voltages in the circuit of FIG. 5 during normal operation.

In other embodiments of the DC-to-DC converter 20, both override feedback control loops 40, 50 may not be needed. As understood with reference to in FIGS. 5–7, only a single negative override feedback control loop 50, may be used. Those components and signals in this alternate embodiment are indicated with prime notation, and these components and signals are similar to those discussed above. Accordingly, for brevity and clarity of explanation, these signals and components need no further discussion herein. The single negative feedback control loop 50' would advantageously only require two pins and two external components to provide user selectability of its trip points. Those of skill in the art will also appreciate that in other embodiments, only a single positive override feedback control loop may be provided. Of course, the dual positive and negative feedback control loops 40, 50 may provide advantages for both negative and positive load transients as will also be appreciated by those skilled in the art.

Figure 8:
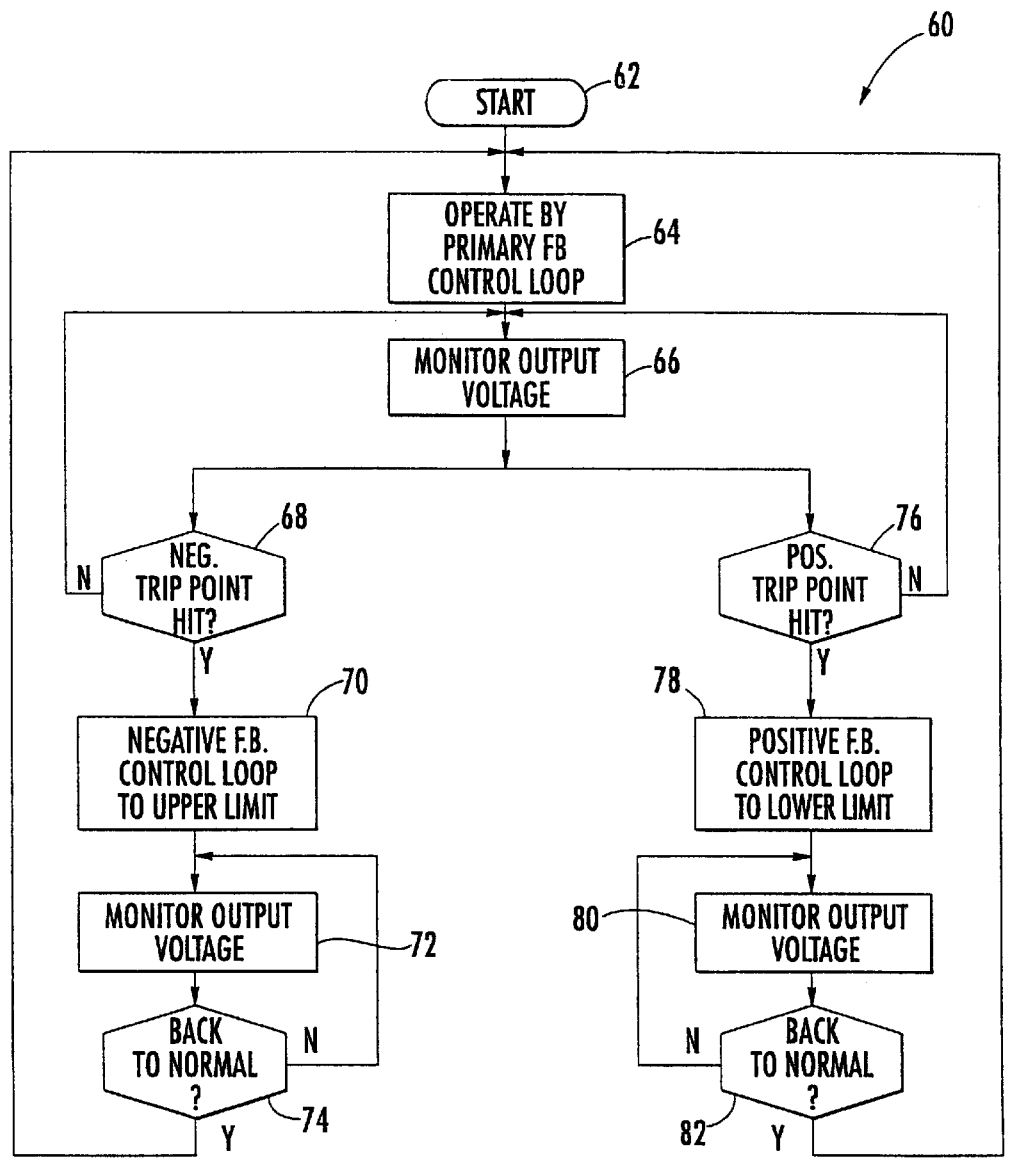
FIG. 8 is a flow chart for method aspects in accordance with the present invention.

Turning now additionally to the flow chart 60 of FIG. 8, method aspects of the invention are now described as relating to a method for operating the DC-to-DC converter 20. From the start (Block 62), the converter 20 may operate using the primary control loop 30 at Block 64. The output voltage Vout is monitored at Block 66. At Block 68 it is determined whether the negative trip point has been reached, and if not, the output voltage is still monitored (Block 66). If, at Block 68 it is determined that the trip point has been reached, the negative override feedback control loop 50 operates to switch the PWM circuit 21 to the upper limit (Block 70). Thereafter, the voltage is monitored at Block 72, and upon its return to normal, that is, when the filter voltage VRC1 and monitored voltage Vm cross again, as determined at Block 74, control returns to the primary feedback control loop 30 (Block 64).

Looking now at the right hand side of the flow chart 60, if the positive trip point is reached as determined at Block 76, then the positive override feedback control loop 40 causes the PWM circuit 21 to go the lower limit at Block 78. The voltage is monitored at Block 80, and in response to its return to normal (Block 82), the converter 20 again operates using the primary feedback control loop 30 at Block 64.

Although the embodiments described herein are primarily directed to single-phase buck, or step-down, converters, those of skill in the art will realize that step-up converters, and/or multi-phase converters, for example, are also contemplated by the present invention. A multi-phase converter is disclosed, for example, in U.S. Pat. No. 6,278,263 B1 to Walters et al., and assigned to the assignee of the present invention. This patent is incorporated herein by reference in its entirety.

It will also be understood by those skilled in the art that, for example, a current control loop may also be used in combination with the illustratively described primary feedback voltage control loop. Of course, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A DC-to-DC converter comprising:
    at least one power switch;
    a pulse width modulation (PWM) circuit cooperating with said at least one power switch for supplying power from a source to a load over a range between a lower limit and an upper limit to thereby control an output voltage for the load;
    a primary feedback control loop cooperating with said PWM circuit for supplying power to the load between the lower and upper limits based upon the output voltage during normal load conditions; and
    at least one override feedback control loop cooperating with said PWM circuit for overriding said primary feedback control loop and supplying power to the load at one of the lower and upper limits based upon the output voltage during a corresponding fast load transient condition.

2. A DC-to-DC converter according to claim 1 wherein said at least one override feedback control loop defines at least one trip point based upon the output voltage for overriding said primary feedback control loop and supplying power to the load at one of the lower and upper limits.

3. A DC-to-DC converter according to claim 2 wherein the at least one trip point is selectable.

4. A DC-to-DC converter according to claim 3 further comprising an integrated circuit substrate; wherein at least portions of said PWM circuit, said primary feedback control loop, and said at least one override feedback control loop are formed in said integrated circuit substrate; and wherein the at least one trip point is selectable by external components from said integrated circuit substrate.

5. A DC-to-DC converter according to claim 2 wherein the at least one trip point is based upon a magnitude of a change of the output voltage.

6. A DC-to-DC converter according to claim 2 wherein the at least one trip point is based upon a rate of change of the output voltage.

7. A DC-to-DC converter according to claim 2 wherein the at least one trip point is based upon both a magnitude of a change of the output voltage and a rate of change of the output voltage.

8. A DC-to-DC converter according to claim 1 wherein said at least one override feedback control loop comprises a positive override feedback control loop for supplying power to the load at the lower limit based upon a transient increase of the output voltage.

9. A DC-to-DC converter according to claim 1 wherein said at least one override feedback control loop comprises a negative override feedback control loop for supplying power to the load at the upper limit based upon a transient decrease of the output voltage.

10. A DC-to-DC converter according to claim 1 wherein said at least one override feedback control loop comprises:
    a positive override feedback control loop for supplying power to the load at the lower limit based upon a transient increase of the output voltage; and
    a negative override feedback control loop for supplying power to the load at the upper limit based upon a transient decrease of the output voltage.

11. A DC-to-DC converter according to claim 1 wherein said at least one override feedback control loop comprises:
    a filter; and
    a comparator having first and second inputs connected to said filter, the first input also receiving a signal based upon the output voltage, said comparator also having an output providing an override feedback control loop signal to said PWM circuit.

12. A DC-to-DC converter according to claim 11 wherein said filter comprises a resistor connected across the first and second inputs, and a capacitor connected between the second input and a voltage reference.

13. A DC-to-DC converter according to claim 11 further comprising a constant current circuit connected to the second input.

14. A DC-to-DC converter comprising:
    a pulse width modulation (PWM) circuit for cooperating with at least one power switch for supplying power from a source to a load over a range between a lower limit and an upper limit to thereby control an output voltage for the load;
    a primary feedback control loop cooperating with said PWM circuit for supplying power to the load between the lower and upper limits based upon the output voltage; and
    at least one override feedback control loop cooperating with said PWM circuit for overriding said primary feedback control loop and supplying power to the load at one of the lower and upper limits based upon the output voltage corresponding fast load transient condition;
    said at least one override feedback control loop defining at least one selectable trip point based upon the output voltage for overriding said primary feedback control loop and supplying power to the load at one of the lower and upper limits.

15. A DC-to-DC converter according to claim 14 further comprising an integrated circuit substrate; wherein at least portions of said PWM circuit, said primary feedback control loop, and said at least one override feedback control loop are formed in said integrated circuit substrate; and wherein the at least one trip point is selectable by external components from said integrated circuit substrate.

16. A DC-to-DC converter according to claim 14 wherein the at least one trip point is based upon a magnitude of a change of the output voltage and based upon a rate of change of the output voltage.

17. A DC-to-DC converter according to claim 14 wherein said at least one override feedback control loop comprises a positive override feedback control loop for supplying power to the load at the lower limit based upon a transient increase of the output voltage.

18. A DC-to-DC converter according to claim 14 wherein said at least one override feedback control loop comprises a negative override feedback control loop for supplying power to the load at the upper limit based upon a transient decrease of the output voltage.

19. A DC-to-DC converter according to claim 14 wherein said at least one override feedback control loop comprises:
    a filter; and
    a comparator having first and second inputs connected to said filter, the first input also receiving a signal based upon the output voltage, said comparator also having an output providing an override feedback control loop signal to said PWM circuit.

20. A DC-to-DC converter according to claim 19 wherein said filter comprises a resistor connected across the first and second inputs, and a capacitor connected between the second input and a voltage reference; and further comprising a constant current circuit connected to the second input.

21. A DC-to-DC converter comprising:
    a pulse width modulation (PWM) circuit cooperating with at least one power switch for supplying power from a source to a load over a range between a lower limit and an upper limit to thereby control an output voltage for the load;
    a primary feedback control loop cooperating with said PWM circuit for supplying power to the load between the lower and upper limits based upon the output voltage; and
    at least one override feedback control loop cooperating with said PWM circuit for overriding said primary feedback control loop and supplying power to the load at one of the lower and upper limits based upon the output voltage during a corresponding fast load transient condition;
    said at least one override feedback control loop defining at least one trip point based upon both a magnitude of a change of the output voltage and a rate of change of the output voltage for overriding said primary feedback control loop and supplying power to the load at one of the lower and upper limits.

22. A DC-to-DC converter according to claim 21 wherein the at least one trip point is selectable.

23. A DC-to-DC converter according to claim 22 further comprising an integrated circuit substrate; wherein at least portions of said PWM circuit, said primary feedback control loop, and said at least one override feedback control loop are formed in said integrated circuit substrate, and wherein the at least one trip point is selectable by external components from said integrated circuit substrate.

24. A DC-to-DC converter according to claim 21 wherein said at least one override feedback control loop comprises a positive override feedback control loop for supplying power to the load at the lower limit based upon a transient increase of the output voltage.

25. A DC-to-DC converter according to claim 21 wherein said at least one override feedback control loop comprises a negative override feedback control loop for supplying power to the load at the upper limit based upon a transient decrease of the output voltage.

26. A DC-to-DC converter according to claim 21 wherein said at least one override feedback control loop comprises:
 a filter; and
 a comparator having first and second inputs connected to said filter, the first input also receiving a signal based upon the output voltage, said comparator also having an output providing an override feedback control loop signal to said PWM circuit.

27. A DC-to-DC converter according to claim 26 wherein said filter comprises a resistor connected across the first and second inputs, and a capacitor connected between the second input and a voltage reference; and further comprising a constant current circuit connected to the second input.

28. A method of operating a DC-to-DC converter comprising at least one power switch, a pulse width modulation (PWM) circuit cooperating with the at least one power switch for supplying power from a source to a load over a range between a lower limit and an upper limit, and a primary feedback control loop cooperating with the PWM circuit for supplying power to the load between lower and upper limits based upon an output voltage, the method comprising:
 monitoring the output voltage; and
 overriding the primary feedback control loop with at least one override feedback control loop for supplying power to the load at one of the lower and upper limits based upon the output voltage during a corresponding fast load transient condition.

29. A method according to claim 28 wherein overriding comprises defining at least one trip point based upon the output voltage for overriding the primary feedback control loop and supplying power to the load at one of the lower and upper limits.

30. A method according to claim 29 further comprising selecting the at least one trip point.

31. A method according to claim 30 wherein the DC-to-DC Converter further comprises an integrated circuit substrate; wherein at least portions of the PWM Circuit, the primary feedback control loop, and the at least one override feedback control loop are formed in the integrated circuit substrate, and wherein selecting comprises selecting the at least one trip point by external components from the integrated circuit substrate.

32. A method according to claim 29 wherein the at least one trip point is based upon a magnitude of a change in the output voltage.

33. A method according to claim 29 wherein the at least one trip point is based upon a rate of change of the output voltage.

34. A method according to claim 29 wherein the at least one trip point is based upon both a magnitude of a change in the output voltage and a rate of change at the output voltage.

35. A method according to claim 28 wherein overriding comprises positive overriding for supplying power to the load at the lower limit based upon a transient increase of the output voltage.

36. A method according to claim 28 wherein overriding comprises negative overriding for supplying power to the load at the upper limit based upon a transient decrease of the output voltage.

37. A DC-to-DC converter comprising:
 a high side power switch having input and output electrodes coupled between a high side voltage source and a common node;
 a low side power switch having input and output electrodes coupled between said common node and a low side reference voltage;
 said common node being coupled through an inductor to an output node feeding a load, with a reference capacitor coupled to said output node;
 a pulse width modulator circuit having a first output driving a control electrode of said high side power switch and a second output driving a control electrode of said low side power switch, so that said common node is controllably switched between said high side voltage and said low side reference voltage;
 a primary feedback control loop which is coupled to monitor the voltage at said output node and is operative to cause said pulse width modulator circuit to control the operations of said high side and low side power switches such that power to said load falls in a range from said low side reference voltage to said high side voltage; and
 an override feedback control loop which is coupled to monitor the voltage at said output node directly and through first and second low pass filter circuits, and is operative to cause said pulse width modulator to fully turn on said high side power switch and fully turn off said low side power switch for a period of time that the voltage directly monitored at said output node is less than the voltage monitored through said first low pass filter circuit, and is operative to cause said pulse width modulator to fully turn on said low side power switch and fully turn off said high side power switch for a period of time that the voltage directly monitored at said output node is greater than the voltage monitored through said second low pass filter circuit.

* * * * *